US008248382B2

(12) United States Patent                    (10) Patent No.:     US 8,248,382 B2
Muranaka                                     (45) Date of Patent:     Aug. 21, 2012

(54) INPUT DEVICE (75) Inventor: Tetsuo Muranaka, Fukushima-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 710 days.

(21) Appl. No.: 12/401,273

(22) Filed: Mar. 10, 2009

(65) Prior Publication Data

US 2009/0229893 A1  Sep. 17, 2009

(30) Foreign Application Priority Data

Mar. 11, 2008  (JP) ................. 2008-061647

(51) Int. Cl.
G06F 3/041 (2006.01)

(52) U.S. Cl. ........................................ 345/173

(58) Field of Classification Search ............ 178/20.01; 345/173
See application file for complete search history.

(56) References Cited

U.S. PATENT DOCUMENTS

2007/0132724 A1*  6/2007  Muranaka .............. 345/156
2008/0158167 A1*  7/2008  Hotelling et al. ........ 345/173
2009/0289918 A1*  11/2009 Muranaka .............. 345/174

FOREIGN PATENT DOCUMENTS

JP    7230352    8/1995
JP    8016307    1/1996

* cited by examiner

Primary Examiner — Quan-Zhen Wang
Assistant Examiner — Nelson D Runkle, III
(74) Attorney, Agent, or Firm — Hunton & Williams LLP (57) ABSTRACT An input device includes a plurality of X scanning electrodes and a common detection electrode that forms capacitances together with the X scanning electrodes. A first driving signal is sequentially supplied to the X scanning electrodes, and a second driving signal is supplied to the X scanning electrodes other than the X scanning electrodes adjacent to the X scanning electrode supplied with the first driving signal. It is possible to detect two X scanning electrodes simultaneously approached by the fingers by detecting a current generated in the detection electrode when the first driving signal P and the second driving signal N are supplied.

7 Claims, 8 Drawing Sheets

| ELECTRODE | X0 | X1 | X2 | X3 | X4 | X5 | OUTPUT |
|---|---|---|---|---|---|---|---|
| T1 | P | P | N | N |   |   | Sn |
| T2 |   | P | P | N | N |   | Sn |
| T3 |   |   | P | P | N | N | 0 |
| T4 | N |   |   | P | P | N | 0 |
| T5 | N | N |   |   | P | P | Sp |
| T6 | P | N | N |   |   | P | Sp |

FINGER — 8

FIG. 4

ELECTRODE                                              OUTPUT

|    | X0 | X1 | X2 | X3 | X4 | X5 |     |
|----|----|----|----|----|----|----|-----|
| T1 | P  |    |    |    |    | N  | 0   |
| T2 |    | P  |    |    |    | N  | Sn  |
| T3 |    |    | P  |    |    | N  | 0   |
| T4 | N  |    |    | P  |    |    | 0   |
| T5 | N  |    |    |    | P  |    | Sn  |
| T6 | N  |    |    |    |    | P  | 0   |

(FINGER) ~8          (FINGER) ~8

| ELECTRODE | | | | | | OUTPUT |
|---|---|---|---|---|---|---|
| | X0 | X1 | X2 | X3 | X4 | X5 | |
| T1 | P | | | | | N | Sn |
| T2 | | P | | | | N | 0 |
| T3 | | | P | | | N | 0 |
| T4 | N | | | P | | | Sp |
| T5 | N | | | | P | | Sp |
| T6 | N | | | | | P | Sp |

FINGER — 8

FIG. 7

| ELECTRODE | X0 | X1 | X2 | X3 | X4 | X5 | OUTPUT |
|---|---|---|---|---|---|---|---|
| T1 | P |   |   |   |   | N | 0 |
| T2 |   | P |   |   |   | N | Sp |
| T3 |   |   | P |   |   | N | Sp |
| T4 | N |   |   | P |   |   | Sp |
| T5 | N |   |   |   | P |   | Sp |
| T6 | N |   |   |   |   | P | 0 |

FINGER 8

FINGER 8

FIG. 8

| ELECTRODE | | | | | | | | OUTPUT |
|---|---|---|---|---|---|---|---|---|
| | X0 | X1 | X2 | X3 | X4 | X5 | Xd | |
| T1 | P | | | | | | N | Sn |
| T2 | | P | | | | | N | 0 |
| T3 | | | P | | | | N | 0 |
| T4 | | | | P | | | N | 0 |
| T5 | | | | | P | | N | 0 |
| T6 | | | | | | P | N | Sn |

FINGER — 8

FINGER — 8

INPUT DEVICE

CLAIM OF PRIORITY

This application claims benefit of the Japanese Patent Application No. 2008-61647 filed on Mar. 11, 2008, the entire content of which is hereby incorporated by reference.

BACKGROUND OF THE DISCLOSURE

1. Technical Field

The present invention relates to an input device that detects the approach of an operating body, such as a user's finger, using a variation in capacitance, and more particularly, to an input device capable of detecting the approach of a plurality of operating bodies.

2. Related Art

Various electronic apparatuses, such as personal computers, are provided with input devices including flat scanning pads. In this type of input device, when a finger touches the scanning pad, the coordinates of the contact position of the finger with the scanning pad are detected. It is possible to perform an input operation on various electronic apparatuses by detecting the contact position of the finger.

In general, the input device according to the related art can detect only one contact point of the finger with the input pad. However, in the electronic apparatuses, in some cases, when a plurality of fingers simultaneously touch the input pad, it is necessary to individually detect the contact positions of the fingers.

JP-A-7-230352. and JP-A-8-16307 disclose input devices capable of detecting the contact positions of a plurality of fingers with the input pad.

The input pad disclosed in JP-A-7-230352 includes a plurality of X direction electrodes and a plurality of Y direction electrodes, and AC signals are supplied to the X direction electrodes and the Y direction electrodes. When a finger approaches an intersection of any one of the X direction electrodes and any one of the Y direction electrodes, the intersection capacitance between the X direction electrode and the Y direction electrode is attenuated, and the level of the AC signal between the X direction electrode and the Y direction electrode is lowered. When a plurality of fingers approach, it is possible to individually detect the intersections between the electrodes approached by the fingers by sequentially supplying the AC signals to the X direction electrodes and the Y direction electrodes.

When a plurality of fingers touch the input pad, the input device disclosed in JP-A-8-16307 can individually detect the contact positions of the fingers using a surface acoustic wave touch plate or a two-dimensional optical sensor array touch plate.

The input device disclosed in JP-A-7-230352 detects a variation in the intersection capacitance between the X direction electrode and the Y direction electrode. Therefore, in order to individually detect the approach positions of a plurality of fingers, it is necessary to sequentially monitor the intersection capacitances at the intersection between all the electrodes. In order to meet the necessity, it is necessary to individually detect a variation in the level of a signal between a selected X direction electrode and a selected Y direction electrode and sequentially perform the detecting operation on all of the X direction electrodes and the Y direction electrodes. In such a detecting method, the load of a detecting circuit is increased, and it is necessary to sequentially examine a variation in the intersection capacitances of all the intersections. Therefore, it takes a long time to scan all the intersections of an input panel and it is difficult to rapidly perform a detecting operation.

The input device disclosed in JP-A-8-16307 is a surface acoustic wave type or a two-dimensional optical sensor array type. Therefore, the touch plate has a complicated structure and is expensive, and a detecting circuit is also complicated, which is not practical.

These and other drawbacks exist.

SUMMARY OF THE DISCLOSURE

According to an exemplary embodiment, an input device may include: a plurality of scanning electrodes that extend in a Y direction and are arranged at predetermined intervals in an X direction orthogonal to the Y direction; a detection electrode that forms capacitances together with all the scanning electrodes in a detection region; a driver that supplies pulse driving signals to the scanning electrodes; and a detecting unit that detects the scanning electrode approached by an operating body on the basis of a detection signal obtained from the detection electrode and the supply time of the driving signals to the scanning electrodes. The driver may simultaneously supply a first driving signal and a second driving signal having rise and fall times that are opposite to those of the first driving signal to different scanning electrodes within the same scanning time. In such an embodiment, the first and second driving signals may be pulse signals. The first driving signal may be sequentially supplied to the scanning electrodes in the detection region and the second driving signal may be supplied to the scanning electrodes other than the scanning electrodes disposed at both sides of the scanning electrode supplied with the first driving signal, within the same scanning time.

Such an input device can detect the scanning electrode approached by the operating body by detecting the detection signal from the detection electrodes whose number is smaller than that of scanning electrodes, for example, one detection electrode, when the driving signal is sequentially supplied to the scanning electrodes. Therefore, it is possible to simplify the structure of a detecting circuit, unlike the related art that detects the contact position of an operating body by switching the detection signals obtained from a plurality of electrodes. In addition, two kinds of driving signals having opposite rise and fall times are not simultaneously supplied to adjacent scanning electrodes. Therefore, when a plurality of operating bodies approach, it is possible to individually detect the positions of the operating bodies.

That is, in an input device according to various embodiments, the detecting unit may detect the individual scanning electrodes approached by a plurality of operating bodies, on the basis of the detection signal obtained from the detection electrode and the supply time of the driving signals to the scanning electrodes.

For example, in an input device according to various embodiments, the second driving signal may be supplied to the scanning electrodes disposed at both ends of the detection region. The second driving signal may be selectively supplied to the scanning electrodes disposed at both ends of the detection region.

Such an input device may switch a first driving mode in which the second driving signal may be supplied to the scanning electrodes other than the scanning electrodes disposed at both sides of the scanning electrode supplied with the first driving signal within the same scanning time, and a second driving mode in which the driver may supply the first driving signal and the second driving signal to adjacent scanning electrodes, and the scanning electrode supplied with the first driving signal and the scanning electrode supplied with the second driving signal may be sequentially shifted.

An input device according to various embodiments may further include a plurality of Y scanning electrodes that extend in the X direction, and may be arranged at predetermined intervals in the Y direction. Capacitances may be formed between the detection electrode and all the Y scanning electrodes in the detection region, and the driver may supply the first driving signal and the second driving signal to the Y scanning electrodes, similar to the scanning electrodes.

An input device according to various embodiments may include only a plurality of X scanning electrodes that extend in the Y direction and are arranged at predetermined intervals in the X direction and a detection electrode that forms capacitances together with the X scanning electrodes. According to this structure, the input device may obtain information on only the X coordinate of the approach position of an operating body.

An input device according to various embodiments may include a plurality of X scanning electrodes that may extend in the Y direction and may be arranged at predetermined intervals in the X direction, a plurality of Y scanning electrodes that may extend in the X direction and may be arranged at predetermined intervals in the Y direction, and a common detection electrode that may form capacitances together with the X scanning electrode and the Y scanning electrodes. According to this structure, the input device may obtain information on both the X and Y coordinates of the approach position of an operating body.

An input device according to various embodiments may detect a detection signal from the detection electrode. Therefore, a detecting circuit does not need to perform a complicated process, such as a process of switching detection electrodes, and it may be possible to rapidly detect the approach position of an operating body with a relatively simple structure. In addition, when a plurality of operating bodies approach, it may be possible to individually detect the approach positions of the operating bodies.

Other embodiments may be considered.

DESCRIPTION OF EXEMPLARY EMBODIMENTS

The following description is intended to convey a thorough understanding of the embodiments described by providing a number of specific embodiments and details involving input devices. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Figure 1:
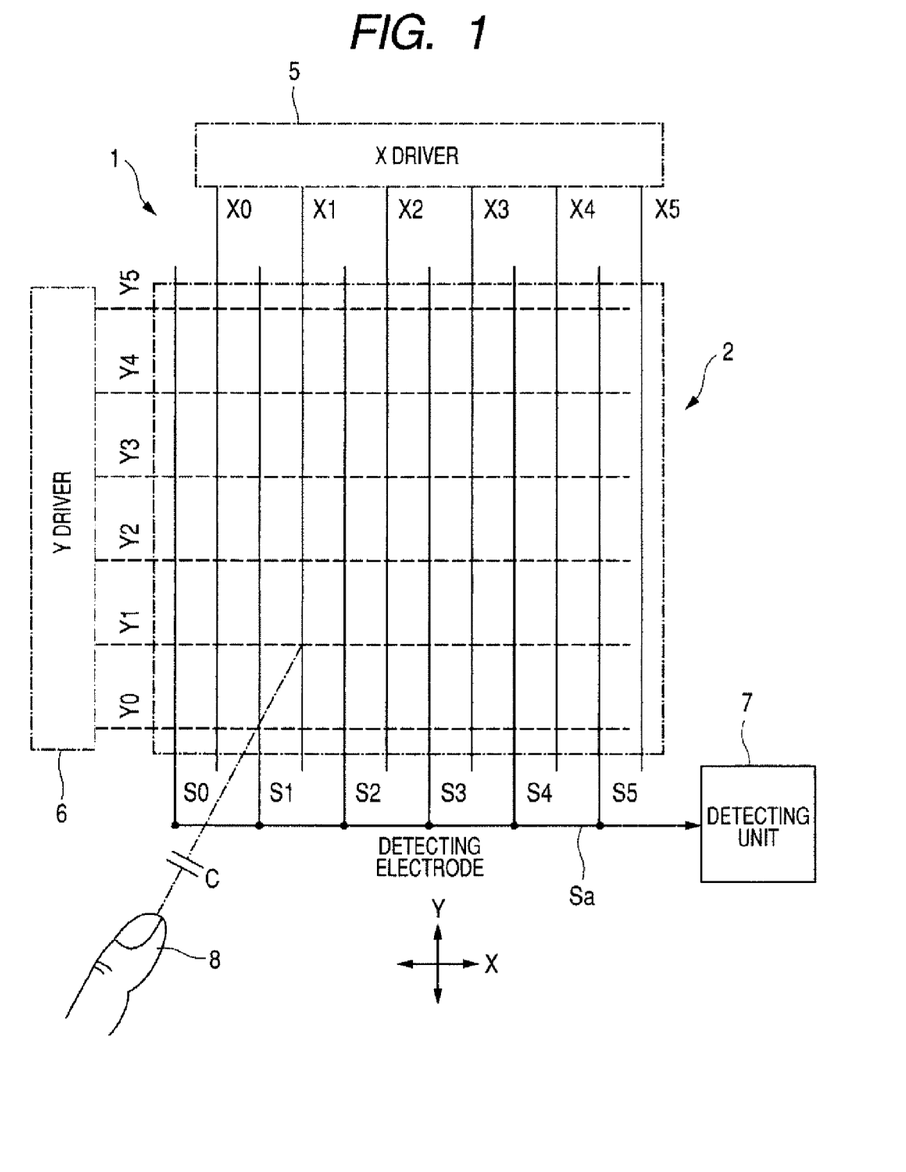
FIG. 1 is a diagram illustrating an exemplary arrangement of scanning electrodes and detection electrodes in an input device according to an embodiment of the disclosure.

FIG. 1 is a diagram schematically illustrating the structure of an input device 1 according to an embodiment of the disclosure.

Input device 1 may include an input pad, and the input pad may include a detection region 2 having a predetermined area that can be operated by a finger, which may be referred to as an operating body. Input pad 1 may be provided with a plurality of X scanning electrodes, a plurality of Y scanning electrodes, and a plurality of detection electrodes.

The detection region 2 may be provided with, for example, six X scanning electrodes X0, X1, X2, X3, X4, and X5. These X scanning electrodes may extend in a straight line in a Y direction so as to be parallel to each other. In addition, the X scanning electrodes may be arranged at predetermined pitches in an X direction. The detection region 2 also may be provided with, for example, six Y scanning electrodes Y0, Y1, Y2, Y3, Y4, and Y5. These Y scanning electrodes may extend in a straight line in the X direction so as to be parallel to each other. In addition, the Y scanning electrodes may be arranged at predetermined pitches in the Y direction. Although FIG. 1 illustrates an exemplary embodiment having six X scanning electrodes and six Y scanning electrodes, various embodiments may include other numbers of scanning electrodes without departing from the spirit and scope of the disclosure.

The exemplary six X scanning electrodes and the six Y scanning electrodes intersect each other in the detection region 2. However, the X scanning electrodes and the Y scanning electrodes may be insulated from each other at the intersections therebetween.

The detection region 2 may be provided with, for example, six detection electrodes S0, S1, S2, S3, S4, and S5. The detection electrodes may extend in a straight line in the Y direction, and may be arranged at predetermined pitches in the X direction. The X scanning electrodes and the detection electrodes may be arranged at predetermined intervals in the X direction so as to be parallel to each other.

As shown in FIG. 1, the X scanning electrode X0 may be disposed between the detection electrode S0 and the detection electrode S1. The X scanning electrode X1 may be disposed between the detection electrode S1 and the detection electrode S2. The X scanning electrode X2 may be disposed between the detection electrode S2 and the detection electrode S3. The X scanning electrode X3 may be disposed between the detection electrode S3 and the detection electrode S4. The X scanning electrode X4 may be disposed between the detection electrode S4 and the detection electrode S5. The detection electrode S5 may be disposed between the X scanning electrode X4 and the X scanning electrode X5.

In various embodiments, the detection electrodes may be insulated from the corresponding X scanning electrodes and the corresponding Y scanning electrodes.

The exemplary six X scanning electrodes and the six detection electrodes may be formed in the same plane. The six Y scanning electrodes may be formed in a plane that is different from the above-mentioned plane between the X scanning electrodes and the detection electrodes, with an insulating layer interposed therebetween. In addition, the plane in which the X scanning electrodes and the detection electrodes are formed may be covered with an insulating sheet. In the input pad, the surface of the insulating sheet may serve as a flat input surface. In the input device 1, a finger, which is an operating body having a ground potential, may touch the input surface in the detection region 2 to perform an input operation.

The input device 1 shown in FIG. 1 may include an X driver 5, a Y driver 6, and a detecting unit 7 as circuit components. The X driver 5 may sequentially supply driving signals to the six X scanning electrodes X0, X1, X2, X3, X4, and X5, and the Y driver 6 sequentially supplies driving signals to the six Y scanning electrodes Y0, Y1, Y2, Y3, Y4, and Y5.

The six detection electrodes S0, S1, S2, S3, S4, and S5 may be connected to a single detection line Sa, and may supply the detection signal obtained from the detection line Sa to a detecting unit 7.

The detecting unit 7 may include a detecting circuit that may detect a detection current r which may be the detection signal obtained from the detection line Sa, as a voltage value and an arithmetic unit that may convert the voltage value into a digital value and output the digital value. The arithmetic unit may set a scanning time at a predetermined interval. It may be possible to detect the contact position of a finger 8, which is an operating body, of a user with the input surface in the detection region 2, on the basis of a variation in the value of the detection voltage obtained from the detection line Sa within the scanning time, the supply time of the driving signal from the X driver 5 to the X scanning electrodes, and the supply time of the driving signal from the Y driver 6 to the Y scanning electrodes FIGS. 2A to 2D are diagrams illustrating the waveforms of the driving signals and the detection signals during a detecting operation of the input device 1.

In the input device 1, capacitances may be formed between the X scanning electrode X0 and the detection electrodes S0 and S1 disposed at both sides of the X scanning electrode X0, and capacitances may be formed between the X scanning electrode X1 and the detection electrodes S1 and S2 disposed at both sides of the X scanning electrode X1. Capacitances may be formed between all of the X scanning electrodes X0, X1, X2, X3, X4, and X5 and the detection electrodes.

In addition, capacitances may also be formed between all the detection electrodes S0, S1, S2, S3, S4, and S5 and all the Y scanning electrodes Y0, Y1, Y2, Y3, Y4, and Y5.

Figure 2A:
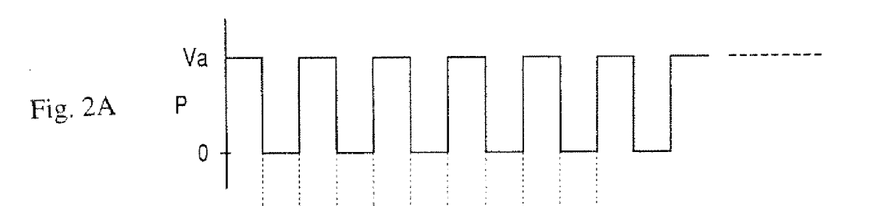
FIG. 2A is a diagram illustrating a waveform of a first driving signal.
Figure 2B:
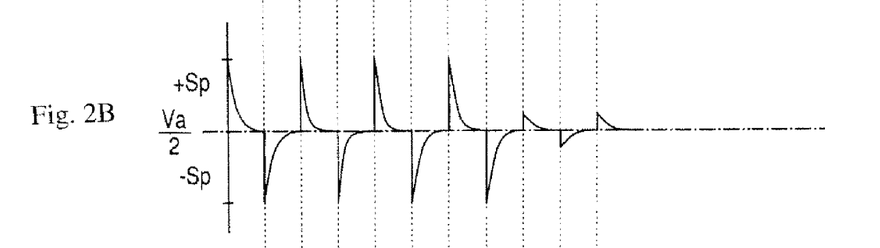
FIG. 2B is a diagram illustrating a waveform of a detection signal generated due to the first driving signal.
Figure 2C:
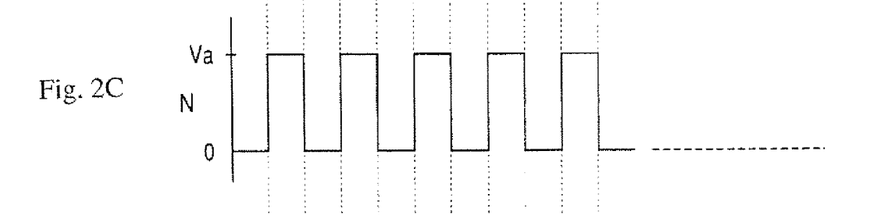
FIG. 2C is a diagram illustrating a waveform of a second driving signal.

FIG. 2A shows a first driving signal P that may be supplied to the X scanning electrode and the Y scanning electrode, and FIG. 2C shows a second driving signal N that may be supplied to the X scanning electrode and the Y scanning electrode. The first driving signal P may be a pulse signal having rising edges and falling edges that are alternately repeated on the positive side of a reference potential (0). A voltage may have a rising edge at times ta, tc, te, tg, ti, . . . , and the voltage may have a failing edge at times tb, td, tf, th, tj, . . . . The second driving signal N also may be a pulse signal having rising edges and falling edges that are alternately repeated on the positive side of the reference potential (0). However, in the first driving signal P and the second driving signal N, the rise and fall times of the pulses may be opposite to each other. In the second driving signal N, a voltage may have a falling edge at the times ta, tc, te, tg, ti, . . . , and the voltage may have a rising edge at the times tb, td, tf, th, tj, . . . .

The X driver 5 may simultaneously supply the first driving signal P and the second driving signal N to different X scanning electrodes within the same scanning time. Therefore, the X scanning electrodes supplied with the first driving signal P and the second driving signal N may be sequentially switched for each scanning time. Similarly, the Y driver 5 may supply the first driving signal P and the second driving signal N to different Y scanning electrodes within the same scanning time. Therefore, the Y scanning electrodes supplied with the first driving signal P and the second driving signal N may be sequentially switched for each scanning time.

However, the same driving signal may not be supplied to the X scanning electrode and the Y scanning electrode within the same scanning time, but the driving signal may be supplied to the x scanning electrode and the Y scanning electrode at different times.

The reference potential (0) shown in FIGS. 2A and 2C may be 0 volt or a predetermined positive or negative potential. By way of example, in FIGS. 2A and 2C, the reference potential (0) is 0 volt, and the rising potential Va of the pulse of each of the first driving signal P and the second driving signal N is 3 volts or 5 volts.

The driving signal shown in FIG. 2C may be the first driving signal, and the driving signal shown in FIG. 2A may be the second driving signal.

Next, the principle of detecting the approach position of a finger in a driving mode that supplies the first driving signal P and the second driving signal N will be described.

For example, it is assumed that the first driving signal P shown in FIG. 2A and the second driving signal N shown in FIG. 2C are supplied to the X scanning electrode X1 and the X scanning electrode X2 within the same scanning time, respectively.

Figure 2D:
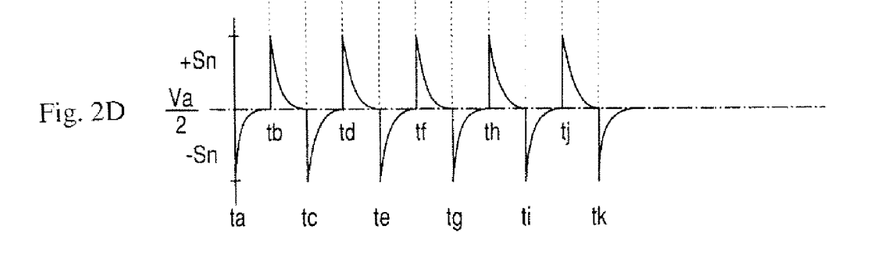
FIG. 2D is a diagram illustrating a waveform of a detection signal generated due to a second driving signal.

FIGS. 2B and 2D show the waveforms of the detection signals obtained from the detection line Sa when the finger 8 is separated from both the X scanning electrode X1 and the X scanning electrode X2 for the period from the time ta to the time th and when the finger 8 approaches the X scanning electrode X1 after the time ti, as shown in FIG. 1.

As shown in FIG. 2B, when the first driving signal P is supplied to the X scanning electrode X1 for the period from the time ta to the time th, a detection current may be generated in the detection electrode S1 and the detection electrode S2 adjacent to the X scanning electrode X1. FIG. 2B shows a detection voltage obtained from the detection electrode. The reference potential shown in FIG. 2B may be a middle point (Va/2) of the voltage Va of the pulse shown in FIG. 2A.

When the first driving signal P supplied to the X scanning electrode X1 rises at the times ta, tc, te, and tg, a positive current flows to the detection electrodes S1 and S2 adjacent to the X scanning electrode X1. Since the first driving signal P supplied to the X scanning electrode X1 falls at the times tb, td, tf, and th, a negative current flows to the detection electrodes S1 and S2 adjacent to the X scanning electrode X1.

That is, the current waveform generated in the detection electrodes S1 and S2 may correspond to a differential value of the voltage waveform of the first driving signal P. FIG. 2B shows a detection voltage obtained from the current waveform. A detection voltage +Sp may be generated on the positive side of the reference potential (Va/2), and a detection voltage −Sp may be generated on the negative side of the reference potential.

As shown in FIG. 2D, when the second driving signal N is supplied to the X scanning electrode X2 for the period from the time ta to the time th, a detection current may be generated in the detection electrode S2 and the detection electrode S3 adjacent to the X scanning electrode X2. Since the second driving signal N supplied to the X scanning electrode X2 falls at the times ta, tc, te, and tg, a negative current may flow to the detection electrodes S2 and S3 adjacent to the X scanning electrode X2 Since the second driving signal N supplied to the X scanning electrode X2 rises at the times tb, td, tf, and th, a positive current may flow to the detection electrodes SS and S3 adjacent to the X scanning electrode X2. In this embodiment, the current waveform may correspond to a differential value of the voltage waveform of the second driving signal N.

FIG. 2D shows a detection voltage obtained from the current waveform. Similar to FIG. 2B, the reference potential may be Va/2, a detection voltage −Sn may be generated on the negative side of the reference potential, and a detection voltage +Sn may be generated on the positive side of the reference potential.

The detection voltages ±Sp shown in FIG. 2A and the detection voltages ±Sn shown in FIG. 2D may be obtained from the detection current flowing through the same detection line Sa. Therefore, the detection voltages ±Sp and the detection voltages ±Sn may offset each other for the period from the time ta to the time th. That is, the detection current that may flow from the detection line Sa to the detecting unit 7 may be approximately zero, and the detection voltage also may be approximately zero.

Then, after the time ti, as shown in FIG. 1, when the finger 8 having a large area and a substantially ground potential approaches the X scanning electrode X1 of the input surface, a capacitance C may be formed between the finger 8 having a large area and the X scanning electrode X1.

Therefore, after the time ti, at the rise and fall times of the first driving signal P supplied to the X scanning electrode X1, a current may flow to the finger 8 that faces the detection electrode, has an area that is larger than that of the detection electrode, and is closer to the X scanning electrode X1 than the detection electrode. Therefore, at the times ti, tj, tk, . . . , a current generated in the detection electrodes S1 and S2 adjacent to the X scanning electrode X1 may be attenuated to approximately zero. Then, as shown in FIG. 2B, the detection voltage also may be approximately zero.

On the other hand, since the finger 8 does not approach the X scanning electrode X2 supplied with the second driving signal N, the positive and negative currents that may be the same as those at the previous times may be generated in the detection electrodes S2 and S3 disposed at both sides of the X scanning electrode X2 at the times ti, tj, tk, . . . . As a result, as shown in FIG. 2D, the detection voltages ±Sp continuously may be obtained.

As shown in FIG. 2B, since the detection voltage is attenuated due to the first driving signal P after the time ti, only the detection voltages ±Sn caused by the second driving signal N may be obtained.

The detecting unit 7 may monitor the detection signal supplied from the detection line Sa, for example, at the times ta, tc, te, tg, ti, tk, . . . . When the finger 8 is separated from the X scanning electrode X1, the detection signals obtained at the times ta, tc, te, and tg may substantially offset each other to be approximately zero. When the finger 8 approaches the X scanning electrode X1, the negative detection signal −Sn may be detected at the times ti, tk, . . . . As such, when the detecting unit 7 detects the detection signal caused by the second driving signal N, it maybe possible to determine that the finger 8 approaches the X scanning electrode X1 supplied with the first driving signal P at that scanning time.

On the other hand, when the finger 8 approaches the X scanning electrode X2 supplied with the second driving signal N, the detection voltage caused by the second driving signal N may be attenuated at the times ti, tk, . . . . Therefore, only the detection signal +Sp caused by the supplied first driving signal P may be detected from the detection line Sa.

Therefore, it may be possible to detect the X coordinate of the contact position of the finger 8 with the input surface by monitoring information on the X scanning electrode supplied with the first driving signal P and the X scanning electrode supplied with the second driving signal N, and the detection signal obtained from the detection line Sa.

Similarly, it may be possible to detect whether the finger 8 approaches the Y scanning electrode supplied with the first driving signal P or the Y scanning electrode supplied with the second driving signal N by determining whether a detection signal caused by the first driving signal P or a detection signal caused by the second driving signal N is obtained from the detection line Sa when the Y driver 6 supplies the first driving signal P and the second driving signal N to adjacent Y scanning electrodes.

Therefore, it may be possible to detect the Y coordinate of the contact position of the finger 8 with the input surface by monitoring information on the Y scanning electrode supplied with the first driving signal P and the Y scanning electrode supplied with the second driving signal N, and the detection signal obtained from the detection line Sa.

FIGS. 3 to 8 show the supply times of the first driving signal P and the second driving signal N to the X scanning electrodes X0, X1, X2, X3, X4, and X5 in each driving mode.

FIGS. 3 to 8 show only the supply times of the driving signals to the X scanning electrodes. In each driving mode, the first driving signal P and the second driving signal N are also may be supplied to the Y scanning electrodes Y0, Y1, Y2, Y3, Y4, and Y5 at the same supply times as those shown in FIGS. 3 to 8. However, the driving signals may be supplied to the X scanning electrodes and the Y scanning electrodes such that the supply times thereof do not overlap each other.

Next, only the supply time of the driving signal to the X scanning electrode and a detection output at that time will be described. This description similarly may be applied to the supply time of the driving signal to the Y scanning electrode and a detection output at that time.

Figure 3:
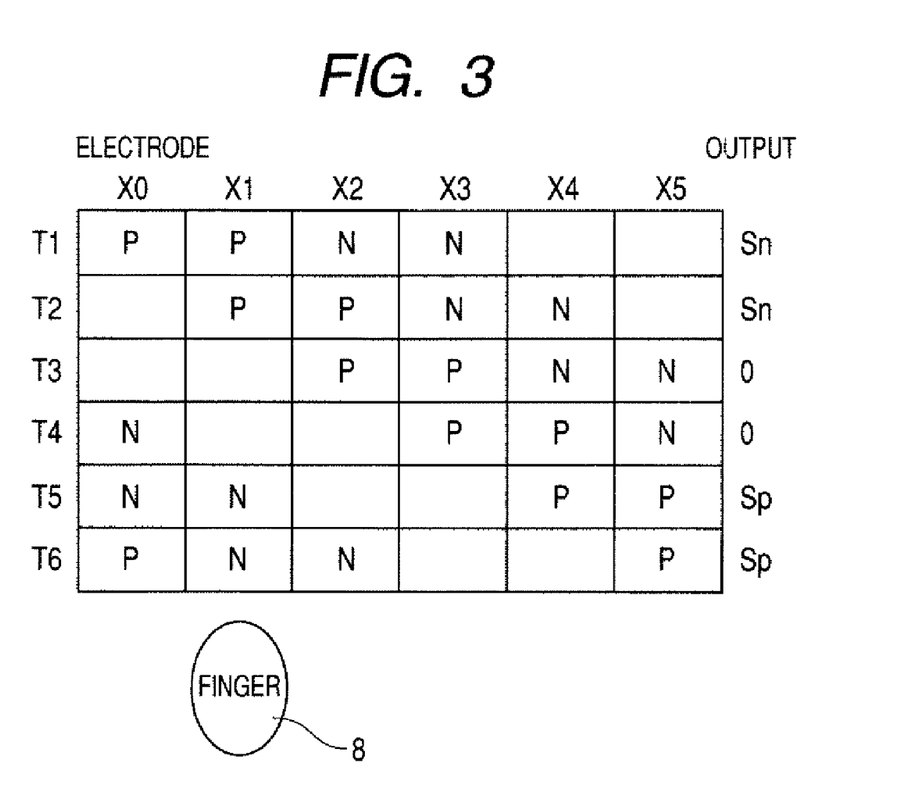
FIG. 3 is a diagram illustrating a detecting operation of an input device in a second driving mode.

FIG. 3 shows an exemplary embodiment of a second driving mode. The second driving mode can detect that one finger B touches the input surface, but cannot detect the positions of the fingers when a plurality of fingers simultaneously touch the input surface. However, in the second driving mode, it may be possible to calculate the X coordinate of the contact position of the finger with high resolution. FIGS. 4 to 8 show exemplary embodiments of a first driving mode. The first driving mode can individually detect the contact positions of the fingers 8 when a plurality of fingers 8 touch the input surface.

The input device 1 can switch between the first driving mode and the second driving mode. Alternatively, the first driving mode and the second driving mode may be alternately performed at different times, and the contact position of the finger 8 may be detected using both the first driving mode and the second driving mode.

In the tables shown in FIGS. 3 to 8, T1, T2, T3, T4, T5, and T6 refer to scanning times. The scanning times T1, T2, T3, T4, T5, and T6 may have the same length.

In the second driving mode shown in FIG. 3, at the scanning time T1, the first driving signal P may be supplied to both the X scanning electrode X0 and the X scanning electrode X1 adjacent to each other. In addition, at the scanning time T1, the second driving signal N may be supplied to both the X scanning electrode X2 adjacent to the X scanning electrode X1 and the X scanning electrode X3 adjacent to the X scanning electrode X2.

One scanning time T1 may have a length from approximately several microseconds (μs) to several tens of microseconds, and the period of the pulse of each of the first driving signal P and the second driving signal N shown in FIGS. 2A and 2C may be in the range of approximately several tens of nanoseconds (ns) to several hundreds of nanoseconds.

Within one scanning time T1, several tens of pulses of the first driving signal P and the second driving signal N may be supplied. Therefore, within one scanning time, several tens of pulses of the detection voltage shown in FIG. 2B and the detection voltage shown in FIG. 2D may be added. The detecting unit 7 may shape the added detection signal having an identifiable size and may determine whether the detection voltage Sp caused by the first driving signal P or the detection voltage Sn caused by the second driving signal N is obtained from the detection line Sa.

As shown in FIG. 3, at the next scanning time T2, the first driving signal P may be supplied to the X scanning electrode X1 and the X scanning electrode X2, and the second driving signal N may be supplied to the X scanning electrode X3 and the X scanning electrode X4. Then, as shown in FIG. 3, the driving signals P, P, N, and N may be supplied in the order of the X scanning electrodes X0, X1, X2, X3, X4, X5, X0, X1, X2, . . . , while being shifted to the right side by one X scanning electrode.

As shown in FIG. 3, when the finger 8 touches a portion of the input surface on the X scanning electrode X1, a current value that is generated in the detection electrode due to the first driving signal P supplied to the X scanning electrode X1 may be attenuated to approximately zero at the scanning time T1, similar to the current shown at the times ti, tj, and tk of FIG. 2B. On the other hand, the detection voltage caused by the first driving signal P supplied to the X scanning electrode X0 has the waveforms +Sp and −Sp, similar to the waveforms shown at the times ta, tb, tc, td, te, tf, tg, and th of FIG. 2B. In addition, the detection voltage caused by the second driving signal N supplied to the X scanning electrode X2 and the detection voltage caused by the second driving signal N supplied to the X scanning electrode X3 may have the waveforms −Sn and +Sn shown in FIG. 2D.

The detection signal obtained from the detection line Sa may be the sum of the detection voltages. Therefore, only the detection signal Sn caused by one second driving signal N may be obtained from the detection line Sa at the scanning time T1 since the detection signal Sp caused by one first driving signal P and the detection signal Sn caused by one second driving signal N offset each other.

Since the first driving signal P is supplied to the X scanning electrode X1 approached by the finger 8 at the scanning time T2, the detection signal obtained from the detection line Sa at that time may be the detection voltage ±Sn caused by one second driving signal N. At the scanning times T3 and T4, no driving signal is supplied to the X scanning electrode X1 approached by the finger 8. Therefore, two detection voltages ±Sp caused by the first driving signal P and two detection voltages ±Sn caused by the second driving signal N may offset each other, and an output signal of the detection line Sa may become approximately zero. Since the second driving signal N is supplied to the X scanning electrode X1 approached by the finger 8 at the scanning times T5 and T6, one detection voltage ±Sp caused by the first driving signal P may be obtained from the detection line Sa.

The detecting unit 7 can detect that the finger 8 is disposed on the X scanning electrode X1 on the basis of the detection signals obtained from the detection line Sa at the scanning times T1, T2, T3, T4, T5, and T6.

In the second driving mode shown in FIG. 3, the first driving signal P and the second driving signal N simultaneously may be supplied to adjacent X scanning electrodes. Therefore, when the finger 8 approaches a space between adjacent X scanning electrodes, it may be possible to calculate the X coordinate of the approach position of the finger 8 with high resolution. For example, when the finger 8 approaches a point close to the X scanning electrode X1 between the X scanning electrode X1 and the X scanning electrode X2, the level of the detection voltage ±Sn obtained at the scanning times T1 and T2 shown in FIG. 3 may be lower than that when the finger 8 is positioned immediately above the X scanning electrode X1. Similarly, the level of the detection voltage ±Sp obtained at the scanning times T5 and T6 may be lower than that when the finger 8 is positioned immediately above the X scanning electrode X1. It may be possible to accurately detect the coordinates of the approach position of the finger 8 between the X scanning electrode X1 and the X scanning electrode X2 on the basis of the decreasing rates of the levels of the detection voltage ±Sn and the detection voltage ±Sp. Therefore, even when six X scanning electrodes are provided in the detection region 2, it may be possible to calculate the X coordinate of the contact position of the finger 8 with the input surface with high resolution.

In the second driving mode, at the scanning time T1, the first driving signal P may be supplied to only one X scanning electrode X0, and the second driving signal N may be supplied to only one X scanning electrode X2 adjacent to the X scanning electrode X0. At the next scanning time T2, the first driving signal P may be supplied to only one X scanning electrode X1, and the second driving signal N may be supplied to only one X scanning electrode X2 adjacent to the X scanning electrode X1. At the scanning time T3, the first driving signal P may be supplied to only one X scanning electrode X2, and the second driving signal N may be supplied to only one scanning electrode X3 adjacent to the X scanning electrode X2. As such, the first driving signal P may be supplied to only one X scanning electrode, and the second driving signal N may be supplied to only one X scanning electrode. In addition, the X scanning electrodes supplied with the driving signal may be shifted one by one.

Next, the first driving mode shown in FIGS. 4 to 7 will be described.

In the first driving mode shown in FIGS. 4 to 7, the first driving signal P may be sequentially supplied to the X scanning electrodes X0, X1, X2, X3, X4, and X5, but the second driving signal N may not be simultaneously supplied to the X scanning electrodes adjacent to the X scanning electrode supplied with the first driving signal P. The second driving signal N may be supplied to only the X scanning electrode X0 and the X scanning electrode X5 disposed at both ends of the detection region 2.

In the first driving mode shown in FIGS. 4 to 7, at the scanning time T1, the first driving signal P may be supplied to the X scanning electrode X0, and the second driving signal N may be supplied to the X scanning electrode X5. At the scanning time T2, the first driving signal P may be supplied to the X scanning electrode X1, and the second driving signal N may be supplied to the X scanning electrode X5. At the scanning time T3, the first driving signal P may be supplied to the X scanning electrode X2, and the second driving signal N may be supplied to the X scanning electrode X5. Then, at the scanning time T4, the second driving signal N may be supplied to the X scanning electrode X0, and the first driving signal P may be supplied to the X scanning electrode X3. At the scanning time T5, the second driving signal N may be supplied to the X scanning electrode X0, and the first driving signal P may be supplied to the X scanning electrode X4. At the scanning time T6, the second driving signal N may be supplied to the X scanning electrode X0, and the first driving signal P may be supplied to the X scanning electrode X5.

That is, the first driving signal P may be sequentially supplied to the X scanning electrodes X0, X1, X2, X3, X4, and X5. At the three scanning times T1, T2, and T3, the second driving signal N may be continuously supplied to the rightmost X scanning electrode X5. At the next three scanning times T4, T5, and T6, the second driving signal N may be continuously supplied to the leftmost X scanning electrode X0.

Figure 4:
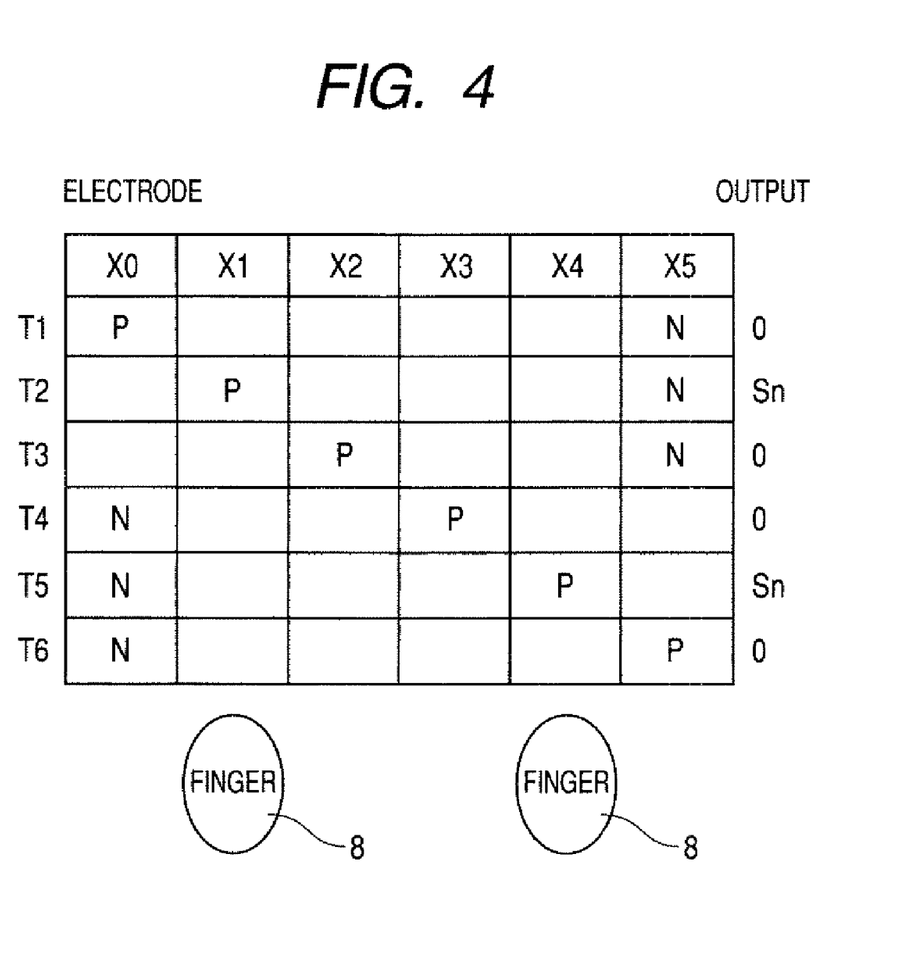
FIG. 4 is a diagram illustrating a detecting operation of an input device in a first driving mode.

FIG. 4 shows detection outputs when the fingers 8 touch portions of the input surface immediately above the X scanning electrode X1 and the X scanning electrode X4 in the first driving mode.

At the scanning time T1, no driving signal is supplied to both the X scanning electrode X1 and the X scanning electrode X4 approached by the fingers 8. Therefore, an output signal of the detection line Sa may be approximately zero since the detection voltage ±Sp caused by the first driving signal P and the detection voltage ±Sn caused by the second driving signal N offset each other. This operation may be similarly performed at the scanning time T3, the scanning time T4, and the scanning time T6.

At the scanning time T2, since the finger 8 is disposed on the X scanning electrode X1 supplied with the first driving signal P at that time, the detection voltage ±Sn caused by the second driving signal N may be obtained from the detection line Sa. At the scanning time T5, since the finger 8 is disposed on the X scanning electrode X4 supplied with the first driving signal P, the detection voltage ±Sn caused by the second driving signal N may be obtained from the detection line Sa. As such, since the detection voltage ±Sn is obtained from the detection line Sa at the scanning times T2 and T5, it may be possible to detect that the fingers 8 are disposed on both the x scanning electrode X1 and the X scanning electrode X4.

When only one finger 8 is disposed on the X scanning electrode X1, the detection voltage ±Sn may be obtained from the detection line Sa at the scanning time T2. However, at the other scanning times, the detection voltage of the detection line Sa may be approximately zero. As such, in the first operation mode, it also may be possible to detect the contact position of one finger.

Figure 5:
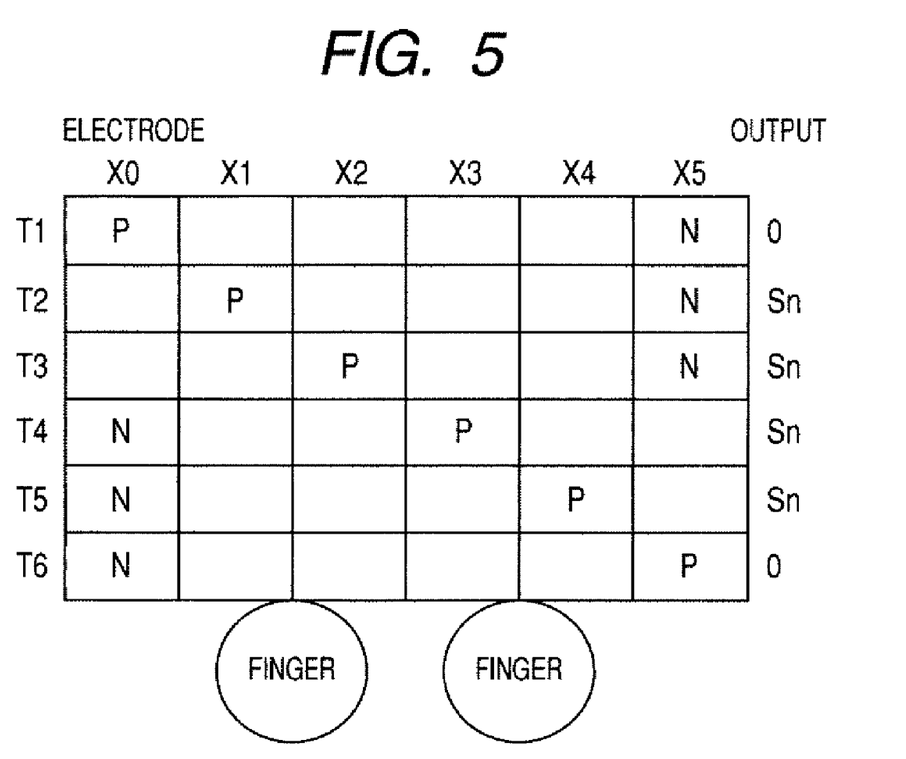
FIG. 5 is a diagram illustrating a detecting operation of an input device in a first driving mode.

FIG. 5 shows detection outputs when two fingers 8 strongly press the input surface such that one finger is disposed on both the X scanning electrode X1 and the X scanning electrode X2 and the other finger is disposed on both the X scanning electrode X3 and the X scanning electrode X4.

In this exemplary embodiment, at the scanning times T1 and T6, the detection signal obtained from the detection line Sa may become approximately zero. At the scanning times T2, T3, T4, and T5, the detection voltage Sn may be obtained from the detection line Sa.

That is, at the first scanning time T1 and the last scanning time T6, the detection voltage ±Sp and the detection voltage ±Sn may offset each other, and the output of the detection line Sa may be approximately zero. At any one of the scanning times T2 to T5, when the detection voltage ±Sn caused by the second driving signal N opposite to the first driving signal P that is sequentially supplied to the X scanning electrodes is detected from the detection line Sa, it may be possible to determine that the finger 8 is disposed on any one of the X scanning electrodes X2 to X4 other than the X scanning electrodes X0 and X5 positioned at both ends of the detection region.

Figure 6:
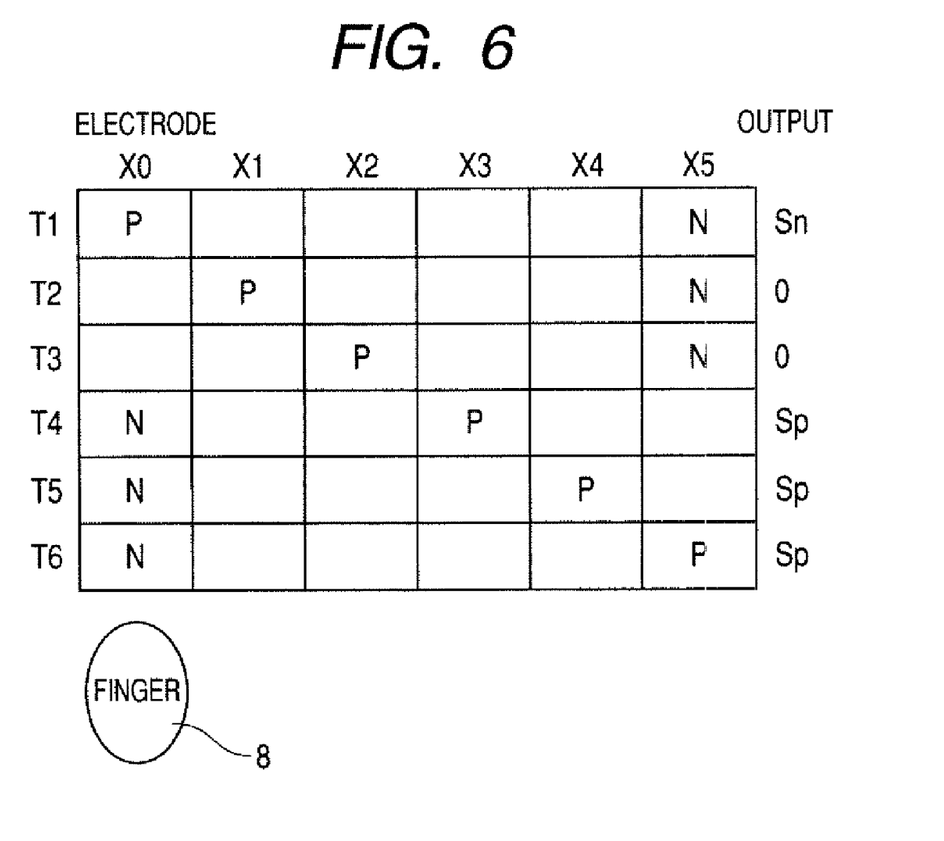
FIG. 6 is a diagram illustrating a detecting operation of an input device in a second driving mode when a finger approaches the scanning electrode disposed at one end.

FIG. 6 shows detection outputs when the finger 8 touches only a portion of the input surface immediately above the leftmost X scanning electrode X0 in the detection region 2.

In this exemplary embodiment, among the three scanning times T1, T2, and T3, which are the first half of the entire scanning period, at the scanning time T1 when the first driving signal P may be supplied to the X scanning electrode X0 on which the finger 8 is disposed, the detection signal obtained from the detection line Sa may be the detection voltage ±Sn caused by the second driving signal N. At the next scanning times T2 and T3, the detection voltage ±Sp caused by the first driving signal P and the detection voltage ±Sn caused by the second driving signal N may offset each other in the detection line Sa, and the output of the detection line Sa may be approximately zero.

At the scanning times T4, T5, and T6, which are the second half of the entire scanning period, the second driving signal N may be continuously supplied to the leftmost X scanning electrode X0 with which the finger 8 is contacted. Therefore, the detection voltage ±Sp caused by the first driving signal P may be continuously obtained from the detection line Sa.

In FIG. 6, when the finger 8 is disposed only immediately above the rightmost X scanning electrode X5, not immediately above the leftmost X scanning electrode X0, the second driving signal N may be continuously supplied to the X scanning electrode X5 on which the finger is disposed, at the three scanning times T1, T2, and T3 Therefore, the detection signal obtained from the detection line Sa may be the detection voltage ±Sp caused by the first driving signal P. At the next three scanning times T4, T5, and T6, the detection signals obtained from the detection line Sa may be 0, 0, and ±Sn, respectively.

Figure 7:
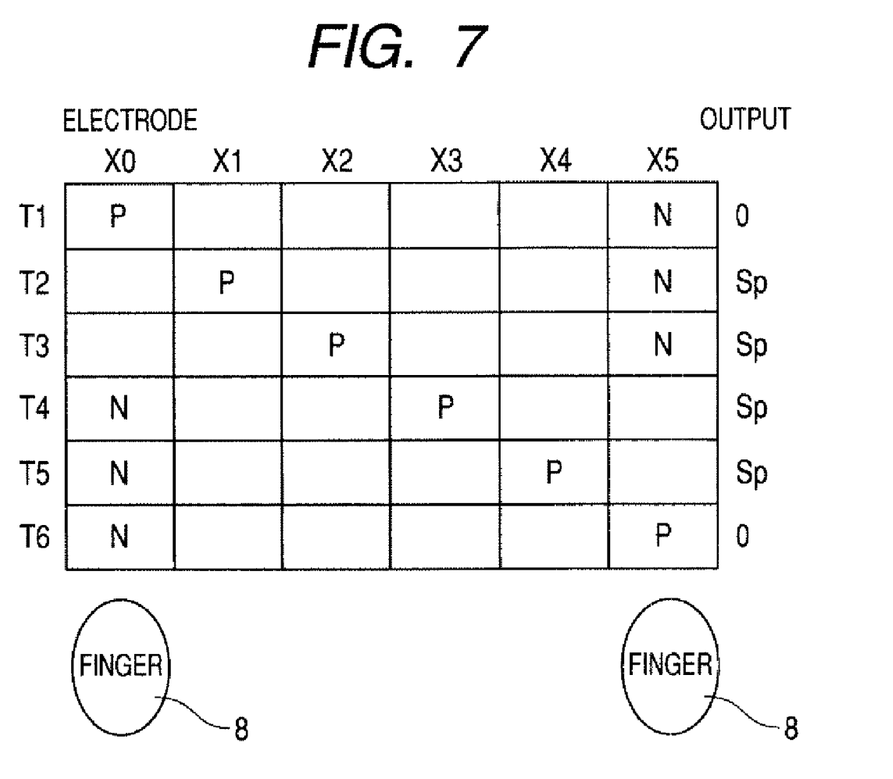
FIG. 7 is a diagram illustrating a detecting operation of an input device in a second driving mode when fingers approach the scanning electrodes disposed at both ends.

FIG. 7 shows the contact state of the fingers 8 with portions of the input surface immediately above the leftmost X scanning electrode X0 and the rightmost X scanning electrode X5 in the first driving mode.

In this exemplary embodiment, at the first scanning time T1 and the last scanning time T6, the first driving signal P and the second driving signal N may be supplied to the X scanning electrode X0 approached by one finger 8 and the X scanning electrode X5 approached by the other finger, respectively. Therefore, at the scanning times T1 and T6, the detection voltage ±Sp caused by the first driving signal P and the detection voltage ±Sn caused by the second driving signal N may offset each other, and the detection voltage of the detection line Sa may be approximately zero.

At the intermediate scanning times T2 to T5, the second driving signal N may be supplied to the X scanning electrode approached by the one finger 8 and the first driving signal P may be supplied to the X scanning electrodes which are not approached by the finger 8. Therefore, at the scanning times T2 to T5, the detection signals ±Sp may be obtained from the detection line Sa.

The detecting unit 7 may store the pattern of the detection signals of the detection line Sa shown in FIGS. 6 and 7, and can detect the pattern of the X scanning electrodes approached by the finger 8, among the patterns shown in FIGS. 4 to 7. As a result, it may be possible to determine the approach position of the finger to the X scanning electrode.

In various embodiment, the approach position of the finger may be determined as follows. When the detection voltage ±Sp caused by the first driving signal P and the detection voltage ±Sn caused by the second driving signal N offset each other in the output signal obtained from the detection line Sa at both the first scanning time T1 and the last scanning time T6, the detecting unit may monitor the detection voltages at the intermediate scanning times T2 to T5, and may determine the approach position of the finger 8 on the basis of the scanning time when the detection voltage ±Sn caused by the second driving signal N supplied to the leftmost and rightmost X scanning electrodes X0 and X5 is obtained.

In addition, it may be determined that the fingers 8 approach the leftmost and rightmost X scanning electrodes X0 and X5 in the following case: the output signals of the detection line Sa at both the first scanning time T1 and the last scanning time T6 are zero since the detection voltage ±Sp caused by the first driving signal P and the detection voltage ±Sn caused by the second driving signal N offset each other; and the detection voltage ±Sp caused by the first driving signal P that is sequentially supplied is obtained from the detection line during the intermediate scanning times T2 to T5.

In various embodiments, detecting unit 7 may individually monitor the detection signals obtained at the three scanning times T1, T2, and T3, which are the first half of the entire scanning period, and the detection signals obtained at the three scanning times T4, T5, and T6, which are the second half of the entire scanning period. As shown in FIG. 6, when the detection signals obtained at the scanning times T4, T5, and T6, which are the second half of the entire scanning period, are the detection voltages ±Sp caused by the first driving signal P supplied to all the electrodes and the detection signals ±Sn, 0, and 0, respectively, may be obtained at the scanning times T1, T2, and T3, which are the first half of the entire scanning period, it may be determined that the finger 8 approaches the leftmost X scanning electrode X0. When the detection signals ±Sp are obtained at all the scanning times T1, T2, and T3, which are the first half of the entire scanning period, and the detection signals 0, 0, and ±Sn, respectively, may be obtained at the scanning times T4, T5, and T6, which are the second half of the entire scanning periods it may be possible to determine that the finger 8 approaches the rightmost X scanning electrode X5.

Figure 8:
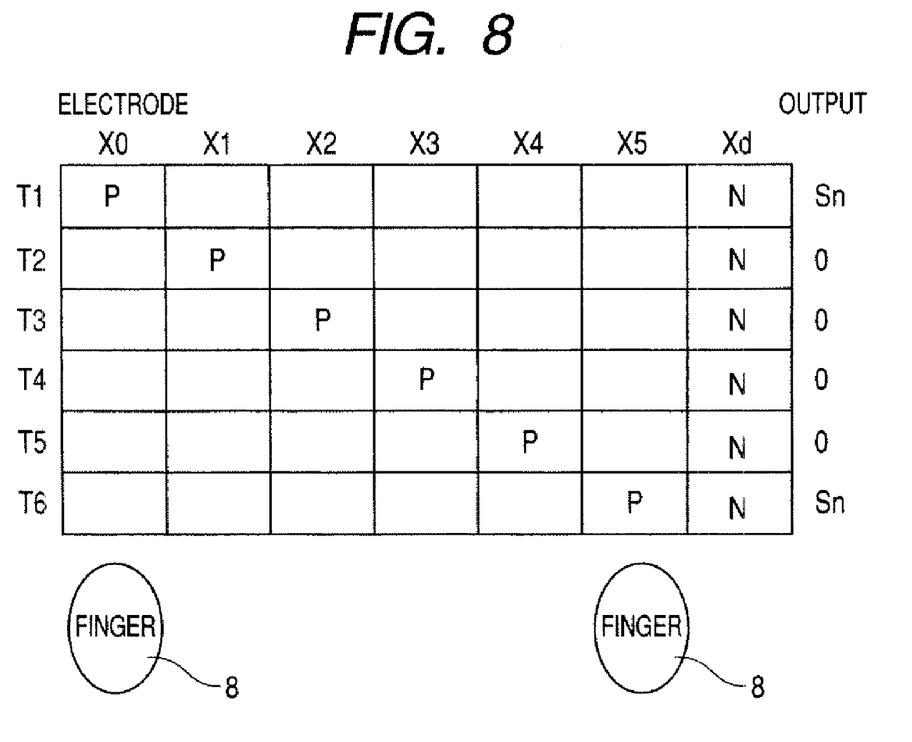
FIG. 8 is a diagram illustrating a detecting operation of an input device in a modification of the second driving mode.

FIG. 8 is a diagram illustrating an exemplary modification of the first operation mode. Other similar modifications may be made without departing from the spirit and scope of the disclosure.

In this exemplary modification, six X scanning electrodes X0, X1, X2, X3, X4, and X5 may be provided in the detection region 2 of the input device 1, and a dummy electrode Xd may be provided outside the detection region 2. A detection electrode may be provided between the dummy electrode Xd and the X scanning electrode X5, or detection electrodes are provided at both sides of the dummy electrode Xd. A capacitance is also formed between the dummy electrode Xd and the detection electrode. The detection electrode forming the capacitance together with the dummy electrode Xd also may be connected to the detection line Sa. Although six electrodes have been shown and described with regard to the exemplary modification in FIG. 8, other numbers of electrodes may be considered without departing from the spirit and scope of the disclosure.

A dummy electrode Yd may be provided outside the detection region 2 so as to be adjacent to the Y scanning electrode Y5. Next, only the principle of detecting a position in the X direction using the X scanning electrode and the dummy electrode Xd will be described. However, this detecting principle is similarly applied to the detection of a position in the Y direction using the Y scanning electrode and the dummy electrode Yd, for example.

As shown in FIG. 8, the second driving signal N may be supplied to the dummy electrode Xd disposed outside the detection region 2 all the time. On the other hand, the first driving signal P may be sequentially supplied to all the X scanning electrodes X0, X1, X2, X3, X4, and X5 disposed in the detection region 2.

In the driving mode shown in FIG. 8, when the first driving signal P is supplied to the X scanning electrodes X1, X2, X3, and X4 which no finger 8 approaches, the detection voltage ±Sp caused by the first driving signal P and the detection voltage ±Sn caused by the second driving signal N may offset each other, and a detection output of the detection line Sa may be approximately zero. However, when the first driving signal P is applied to the X scanning electrodes X0 and X5 approached by the fingers 8, the detection signal obtained from the detection line may be the detection voltage ±Sn caused by the second driving signal N.

In the driving mode shown in FIG. 8, when the finger approaches any one of the X scanning electrodes X0 to X5, the detection voltage Sn may be obtained. Therefore, it may be possible to detect the X scanning electrode approached by the finger 8 by monitoring the scanning time when the detection voltage Sn is obtained. Even when the fingers simultaneously approach a plurality of X scanning electrodes, it may be possible to detect the approach positions of the fingers. That is, in the driving mode shown in FIG. 8, as shown in FIGS. 6 and 7, when the fingers approach the leftmost and rightmost X scanning electrodes, it may be possible to prevent different signals from being output. Therefore, it may be possible to simplify the circuit structure of the detecting unit 7.

Accordingly, the embodiments of the present inventions are not to be limited in scope by the specific embodiments described herein. Further, although some of the embodiments of the present invention have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. An input device comprising:
a plurality of scanning electrodes that extend in a Y direction and are arranged at predetermined intervals in an X direction orthogonal to the Y direction;
a plurality of Y scanning electrodes that extend in the X direction, and are arranged at predetermined intervals in the Y direction;
a detection electrode that forms capacitances together with all the scanning electrodes in a detection region;
a driver that supplies pulse driving signals to the scanning electrodes; and
a detecting unit that detects the scanning electrode approached by an operating body on the basis of a detection signal obtained from the detection electrode and the supply time of the driving signals to the scanning electrodes, wherein the driver simultaneously supplies a first driving signal and a second driving signal having rise and fall times that are opposite to those of the first driving signal to different scanning electrodes within a same scanning time to the scanning electrodes, the first and second driving signals being pulse signals, the first driving signal is sequentially supplied to the adjacent scanning electrodes in the detection region and the second driving signal is supplied to the scanning electrodes other than scanning electrodes disposed at both sides of the scanning electrode supplied with the first driving signal, within the same scanning time, capacitances are formed between the detection electrode and all the Y scanning electrodes in the detection region, and the driver supplies the first driving signal and the second driving signal to the Y scanning electrodes, similar to the scanning electrodes.

2. The input device according to claim 1,
wherein the detecting unit individually detects the scanning electrodes approached by a plurality of operating bodies, on the basis of the detection signal obtained from the detection electrode and the supply time of the driving signals to the scanning electrodes.

3. The input device according to claim 1,
wherein the second driving signal is supplied to the scanning electrodes disposed at both ends of the detection region.

4. The input device according to claim 3,
wherein the second driving signal is selectively supplied to the scanning electrodes disposed at both ends of the detection region.

5. The input device according to claim 1,
wherein the input device can switch a first driving mode in which the second driving signal is supplied to the scanning electrodes other than the scanning electrodes disposed at both sides of the scanning electrode supplied with the first driving signal within the same scanning time, and a second driving mode in which the driver supplies the first driving signal and the second driving signal to adjacent scanning electrodes and the scanning electrode supplied with the first driving signal and the scanning electrode supplied with the second driving signal are sequentially shifted.

6. The input device according to claim 1,
wherein, in a first half and a second half of an entire scanning direction, electrodes supplied with the second driving signal are switched.

7. The input device according to claim 6,
wherein the detection signal obtained in the first half of the entire scanning direction and the detection signal obtained in the second half of the entire scanning direction are individually monitored.

* * * * *